May 19, 1970     P. H. C. YIN     3,512,862
READERS FOR SCALE
Filed Dec. 27, 1967     2 Sheets-Sheet 1
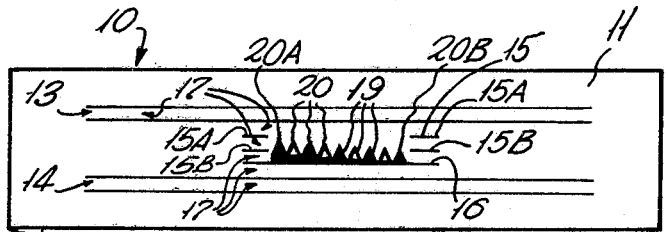
FIG. 1
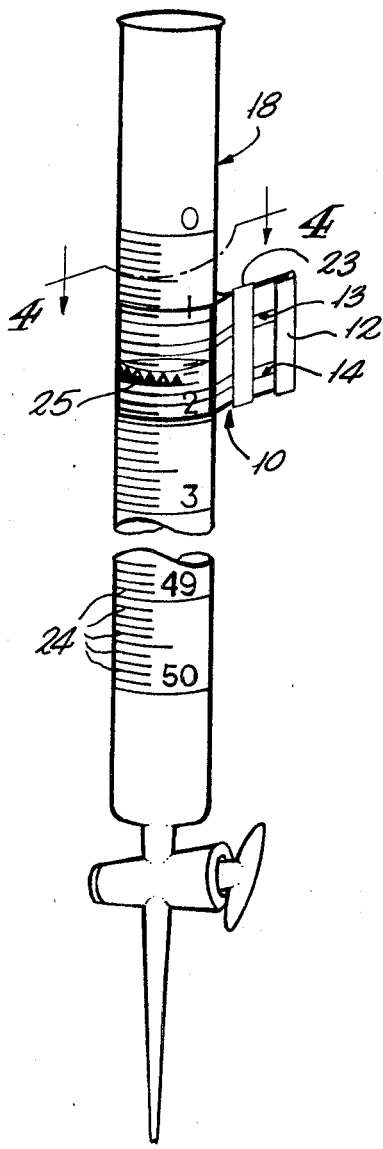
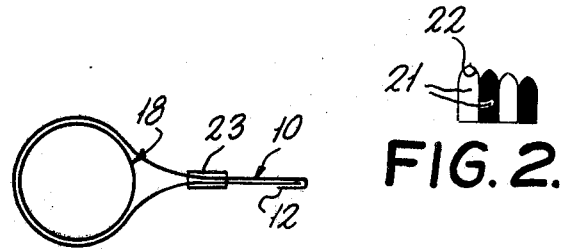
FIG. 2.
FIG. 4.
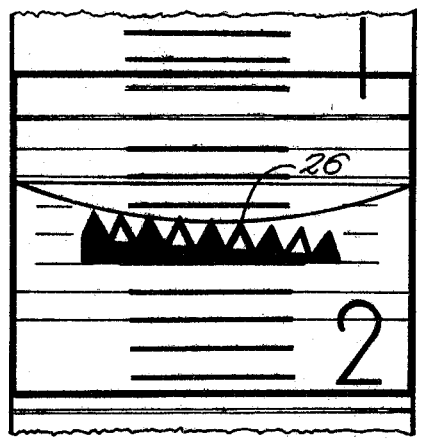
FIG. 3.     FIG. 5.
INVENTOR.
PAUL H. C. YIN May 19, 1970  P. H. C. YIN  3,512,862
READERS FOR SCALE
Filed Dec. 27, 1967  2 Sheets-Sheet 2

INVENTOR.
PAUL H. C. YIN 3,512,862
READERS FOR SCALE
Paul H. C. Yin, 305 Riverside Drive,
New York, N.Y. 10025
Filed Dec. 27, 1967, Ser. No. 694,006
Int. Cl. G02b 27/02; G01d 13/12
U.S. Cl. 350—110                                6 Claims

ABSTRACT OF THE DISCLOSURE

A meniscus reader for burettes and the like in the form of a rectangular plastic transparent member having thereon means to align the transparent member with a unit of the scale on the burette such as a set of horizontal parallel lines spaced apart, second markings thereon in the form of nine sawteeth, the apices of which are laterally offset and equally and vertically spaced from each other and means at the ends of the transparent member for securing the reader onto the burette.

BACKGROUND OF THE INVENTION

Field of the invention

This invention relates to readers for scales having movable markings thereon and, more particularly, to meniscus readers of movable fluid within a hollow transparent member such as burettes and the like.

Description of the prior art

Meniscus readers have been used to determine the position of a fluid inside a hollow transparent member which has a scale engraved or otherwise provided thereon, e.g. burettes. Heretofore, the meniscus readers were used generally to provide a contrasting background so the meniscus is more visibly distinct to the reader. Thus, one of the more successful prior art meniscus readers is in the form of a flat sleeve made by joining a flexible transparent sheet at two parallel edges a relatively rigid rectangular sheet having at the background for the reader one half in white and one half in black. In use, the reader is slipped over the burette sandwiching it between the transparent and the black and white sheets. The straight black and white demarcation provides the required contrast for determining the position of the meniscus.

While the meniscus readers of the prior art served certain useful purposes, they cannot provide the reader with a more accurate readig of the meniscus. If the position of the meniscus is located between two graduation marks on the burette, the reading still requires estimation; hence, a potential source of error.

SUMMARY OF THE INVENTION

I have now discovered that the position of a movable marker, such as a meniscus of a column of fluid, on a scale, can be determined more accurately with a reader constructed in accordance with the teachings of this invention. Broadly stated, the reader comprises a substantially flexible transparent member which has means thereon for securing it onto the scale for movements in a first direction substantially parallel to the scale and in a second direction substantially normal to the first direction. The transparent member also has thereon means for aligning it with a graduation unit of the scale by the movement of the flexible member in a predetermined direction. It also has a series of markings thereon each having a point dividing the unit of the scale into subunits, and each of the points being laterally spaced apart from a line parallel to the first direction and passing through the adjacent point whereby the movement of the transparent member in the second direction, while it is held in alignment with a graduation unit of the scale, brings one of its points closest to or to coincide with the movable marker or the meniscus.

The means for aligning the reader may be in the form of plural dots in fixed position with respect to the series of markings, the movement of which in the predetermined direction positions the series of markings between a unit of the scale.

The reader of this invention is particularly suitable for determining the readings of meniscus of a fluid in burettes, pipettes, barometers, manometers, thermometers, and the like. It has the advantage of providing the accuracy of the reading one additional decimal unit.

BRIEF DESCRIPTION OF THE DRAWINGS

In the accompanying drawings, two preferred embodiments of this invention are shown wherein:

FIG. 1 is a perspective view of the reader;

FIG. 2 is a segment of the reader showing a portion of the indicator thereon;

FIG. 3 is a perspective view of the reader secured on a burette;

FIG. 4 is a cross-sectional view taken along line 4—4 of FIG. 3; and

FIG. 5 is a fragmentary enlarged view taken from FIG. 3.

DESCRIPTION OF THE PREFERRED EMBODIMENT

Figure 6:
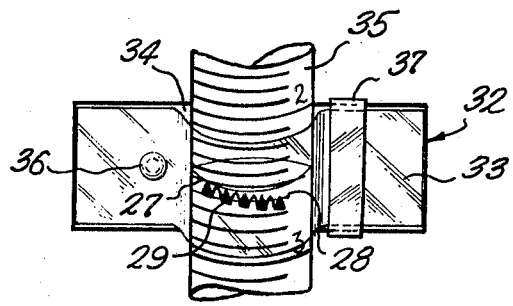
FIG. 6 is a perspective view of a second preferred embodiment of the reader secured on the burette partially shown.

In most conventional measuring equipment in the form of a hollow transparent member, such as glass tubings, which depend on the position of the meniscus of the fluid to provide the reading of the measurement, the accuracy of the measurement is based on the graduation on the transparent member. The fineness of the graduation, however, is necessarily limited because of substantially higher cost and, furthermore, the possibilities of introducing inaccuracies and to deter the visibility or easiness of reading the meniscus. Thus, in a conventional burette, the graduation is limited to $\frac{1}{10}$ milliliter subdivisions. A $\frac{1}{100}$ milliliter value, which is significant for most analytical work, is read by estimating the distance between two graduations. The present invention takes most of the guess work out of estimating $\frac{1}{100}$ ml. values as will be apparent from the following description of the preferred embodiments of this invention.

Referring initially to FIG. 1, the reader 10 is in the form of a thin transparent sheet which can be made of any plastic material, and preferably is the type which is dimensionally stable, chemically resistant, has optical clarity, and is sufficiently thick to be self-supporting. Many commercially available plastic sheets are suitable for preparing the reader of this invention, for example, acrylic, cellulosic, polycarbonate and polyester sheets are eminently suitable. The transparent member 11 of the reader 10 preferably is rectangular in its shape and optionally has at one of its ends a folded section 12 for alignment purposes as will be apparent from subsequent discussion. Provided on the transparent member 11 are two sets of straight lines 13 and 14; each set consists of two parallel lines extending horizontally substantially the entire width of the transparent member 11. Disposed between lines 13 and 14 are four short lines 15 positioned in parallel pairs 15A and 15B and laterally offset to provide a space therebetween, and a bottom line 16 parallel to all the aforesaid lines and extending to the ends of lines 15. The lines 13, 14, 15 and 16 are equally spaced to provide six subdivisions 17 therebetween, each of which is equal to the subdivision on the scale of a burette 18 shown in FIG. 3, which in this specific embodiment is equal to 1/10 milliliter volume of the burette.

Positioning between the space provided by the four short lines 15 are a series of indicators 19 in the form of inclined sawteeth the bottoms of which rest on line 16. The apices 20 of the sawteeth are laterally offset and equally spaced from each other to occupy the space between lines 15. Each of the apices 20 is also vertically offset from its adjacent apex by a distance equal to 1/10 the distance between lines 15A and 15B. The apices 20 are positioned so that the vertical distance between the leftmost apex 20A and the top line 15A and between the rightmost apex 20B and the lower line 15B is 1/10 the distance between lines 15A and 15B, thus the aforesaid apices in combination with the remainder of apices therebetween providing 10 subdivisions within the space between lines 15A and 15B. The sawteeth 19, as shown, have alternative color intensities in black and white or in any other pairs of contrasting colors.

Alternatively, the sawteeth may be in the form of short columns 21 and an arch 22 at its top as shown in FIG. 2.

In application, the reader 10 is wrapped around the burette 18 as shown in FIG. 3 with its free end inserted into the folded portion 12 of the reader and secured thereonto with a slidable flat plastic loop 23. To assure proper alignment, the opposite ends of lines 13 and 14 must be superimposed with each other. The alignment is facilitated somewhat by inserting the free end of the rectangular sheet into the folded section 12 and allowing all the edges to come together. The reader 10 thus secured on the burette is movable in the vertical or axial direction so that the sets of lines 13 and 14 can be aligned with the graduation marks 24 on the scale of the burette 18 above and below the meniscus 25 therein and so that the meniscus falls between or on one of the lines 15A and 15B. Once the preliminary alignment procedure is completed, the apex on the reader which comes closest to or coincides with the lowest point of the meniscus (or the highest point for a convex meniscus) indicates the desired reading. In the specific example shown in FIG. 5, the lowest point of the meniscus coincides with the sixth apex 26 from left thus providing a reading of 0.06 ml. beyond 1.30 ml. or 1.36 ml. To facilitate making this reading, the reader may be advantageously rotated about the burette 18 so as to move the apices 20 into the most convenient viewing position.

A different burette or other similar instrument may be a different calibration for its scale. In other words, the distance between two graduations on one burette may be different from that of the other. This is common with burettes of different makes. However, the variations, in general, are small for a given size of burette. To compensate for the variance, the means for aligning the reader with the graduation of the burette may be in the form shown in FIGS. 6 and 7 of the accompanying drawings.

In this embodiment, the reader 32 is in the form of two rectangular flexible transparent sheets 33 and 34 which in combination form a sleeve for sandwiching the burette 35 therebetween. The flexible sheet 33 on which are the indicators 29, similar to those described for the first embodiment, is secured on the second and preferably a more rigid transparent sheet 34 by fasteners 36 and 37. The fastener 36 advantageously is the rivet type which allows the two sheets 33 and 34 to rotate about the fastener 36 for reasons as will be apparent from the subsequent discussion. The fastener 37 is the type which allows the two sheets 33 and 34 to fasten together at any positions. I found the Velcro type of fastener to be particularly suitable.

Figure 7:
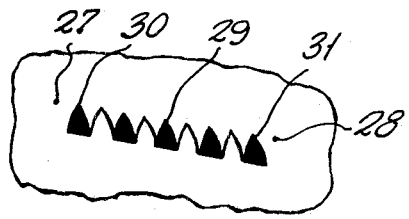
FIG. 7 is a fragmentary enlarged portion taken from FIG. 6.

The aligning means for the reader is in the form of two dots 27 and 28 positioned at the opposite ends of the indicator markings 29. As shown in FIG. 7, the dot 27 is positioned adjacent to the leftmost indicator 30 and spaced apart from its apex at a vertical and a lateral distance equal to those between the apices of two adjacent indicators. Similarly, the dot 28 is positioned adjacent to the rightmost indicator 31 and spaced apart from its apex at a vertical and a lateral distance equal to those between the apices of two adjacent indicators 29.

In using the meniscus reader, the burette 35 is first placed between the two sheets 33 and 34. The first sheet 33 is rotated about the fastener 36 either clockwise or counter-clockwise to ascertain that the dots 27 and 28 are coincided with two graduations as shown in FIG. 6 and thereafter the free ends of the reader 32 are joined by closing the fastener 37.

Once the alignment is completed, the reader may be moved up or down in a manner described hereinabove to obtain the required reading. It is important to note, that once the dots 27 and 28 are aligned with two graduations on the scale, the indicator 29 automatically subdivides the space therebetween into equal units.

I claim:

1. A meniscus reader for accurately determining the readings of a hollow transparent elongated element having a column of movable fluid therein, said reader comprising:
a flexible substantially transparent member,
means for securing said member on said scale by bending said transparent member around said elongated element so that at least a portion of said flexible member is in contact with the surface of said elongated element and slidably thereon for movements in a first direction along the axis of the elongated member and in a second direction axially with respect to said axis,
means for aligning said member with a unit of a scale for said elongated element by the movement of the member in said first direction, and
a series of markings on said transparent member each having a point dividing the unit of the scale into subunits and each of said points being laterally displaced from a line parallel to said first direction and passing through the adjacent point, whereby the movement of the member while in alignment with a unit of the scale in the second direction brings one of its points closest to or to coincide with the meniscus of the fluid in the hollow transparent elongated member.

2. A reader according to claim 1 wherein said series of markings has a configuration representing a plurality of columns of alternating color intensities each having an apex corresponding to said points.

3. A reader according to claim 2 wherein the means for aligning the transparent member is in the form of parallel lines normal to a line on said member parallel to the axis of the elongated element whereby the movement of said member in the first direction brings said lines in alignment with lines on said scale.

4. A reader according to claim 2 wherein the member is substantially rectangular in form and has at one of its ends a loop which allows the other end of the member to pass therethrough for securing said member to the transparent elongated element.

5. A meniscus reader for accurately determining the readings of a hollow transparent element having a column of movable fluid therein and a scale thereon for determining the position of the meniscus of the fluid, which reader comprises:
a flexible substantially transparent member having thereon a series of markings each having a point dividing the graduation of the scale into subunits and each of said points being laterally spaced apart from a line parallel to the axis of the hollow transparent element and passing through the adjacent point of the marking,
a backing member being more rigid than said transparent member and secured onto said transparent member at least at two points to form a sleeve for the hollow transparent element to pass therethrough and slidable thereabout and means for aligning the series of markings on the transparent member with graduation of the scale on the hollow transparent element which is in the form of at least two dots positioned on the transparent member in fixed position with respect to the series of markings whereby a rotational movement of the transparent member with respect to the backing member alters the positions of said dots with respect to the scale thereon and aligns the series of markings with the scale.

6. A reader according to claim 5 wherein said dots being positioned at the two extremities of the series of markings and the vertical and horizontal distances between the dots and the point of the adjacent markings being the same.

References Cited

UNITED STATES PATENTS

| | | | |
|---|---|---|---|
| 1,465,106 | 8/1923 | White | 33—173 |
| 1,860,986 | 5/1932 | Boyce | 350—116 X |
| 2,389,282 | 11/1945 | Stegeman | 350—116 |
| 2,797,614 | 7/1957 | Heidenhain | 350—116 |
| 3,045,495 | 7/1962 | Spencer et al. | 23—292 X |

FOREIGN PATENTS

| | | |
|---|---|---|
| 580,167 | 6/1933 | Germany. |
| 596,096 | 12/1947 | Great Britain. |

LOUIS R. PRINCE, Primary Examiner

D. M. YASICH, Assistant Examiner

U.S. Cl. X.R.

33—126.7; 73—428; 116—114